United States Patent [19]

Curwen

[11] Patent Number: 4,964,535

[45] Date of Patent: Oct. 23, 1990

[54] DISPENSING APPARATUS

[76] Inventor: Neil W. Curwen, 18 Andante Street, Falcon, South Mandurah, Western Australia, 6210, Australia

[21] Appl. No.: 367,765

[22] Filed: Jun. 16, 1989

[30] Foreign Application Priority Data

Jun. 17, 1988 [AU] Australia .................................. PI8830

[51] Int. Cl.⁵ ............................................. G01F 11/10
[52] U.S. Cl. ....................................... 222/67; 222/643; 222/650; 222/349; 222/352; 222/368; 119/56.1
[58] Field of Search ................ 222/643, 650, 306, 349, 222/352, 67, 368; 119/51.11, 51.12, 56.1, 56.2

[56] References Cited

U.S. PATENT DOCUMENTS

| 3,033,164 | 5/1962 | Evers ............................. | 119/56.1 X |
| 3,150,798 | 9/1964 | Sutton ............................ | 222/650 X |
| 3,578,209 | 5/1971 | Fraser ........................... | 222/368 X |
| 3,648,660 | 3/1972 | Esquival ........................ | 119/51.11 |
| 3,659,754 | 5/1972 | Barone .......................... | 222/368 |
| 4,079,699 | 3/1978 | Longmore et al. ........... | 119/51.11 |
| 4,497,280 | 2/1985 | Sanstrom ...................... | 119/56.1 X |
| 4,522,152 | 6/1985 | Meyer ........................... | 119/56.1 |
| 4,688,520 | 8/1987 | Parks ............................ | 119/51.11 |
| 4,722,300 | 2/1988 | Walker et al. ................. | 119/51.11 |
| 4,841,913 | 6/1989 | Forrer ........................... | 119/51.12 |

FOREIGN PATENT DOCUMENTS 2599722 12/1987 France .
1571947 7/1980 United Kingdom .

OTHER PUBLICATIONS

Abstract of South African Patent Number 87/5182; Jul. 15, 1987.

Primary Examiner—Andres Kashnikow
Assistant Examiner—Gregory L. Huson
Attorney, Agent, or Firm—Brooks & Kushman

[57] ABSTRACT

A dispensing apparatus, especially intended for particulate pet food, comprising a hopper having a metering chamber thereunder. The metering chamber has a tumbler rotatable by a motor and controlled by a control means. The tumbler has a longitudinal cavity to receive and dispense pet food and is journalled to the metering chamber with a flap bearing resiliently on it. The tumbler has a plurality of spaced apart fins radiating from it to prevent accumulation of dust and to inhibit jamming of the mechanism. The tumbler is also easily removable for cleaning. Also disclosed are food and water containers.

10 Claims, 6 Drawing Sheets

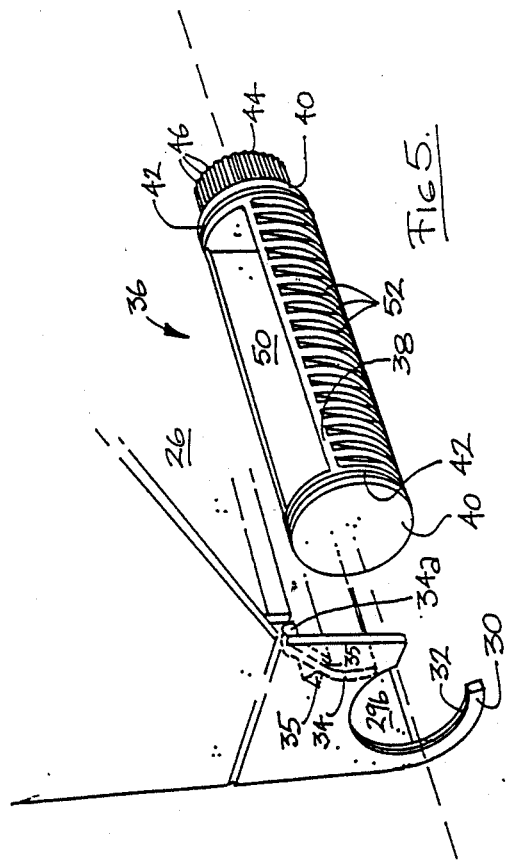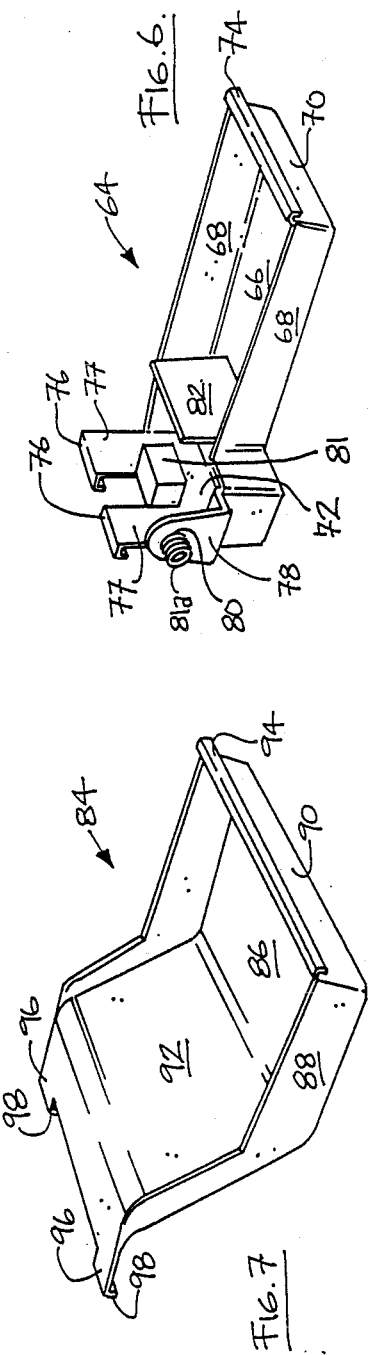

DISPENSING APPARATUS

The present invention relates to a dispensing apparatus. More particularly, the present invention relates to a dispensing apparatus for particulate matter.

BACKGROUND OF THE INVENTION

Prior art dispensing apparatus are known to provide unitizing feed compartments for timed feeding of animals as shown in British Patent No. 2170087. This suffers from the disadvantage of allowing only as many feeds as the compartments.

Prior art dispensing apparatus are also known to provide time dispensing of feed into a container as shown in British Patent No. 1571947, South African Patent Application No. 87/5182 and French Patent No. 2599722. The disadvantages of these types of dispensers is that they are not readily demountable to allow cleaning of components that come into contact with the feed. Also these dispensers do not allow for multiple dispensings of feed at timed intervals.

The present invention provides a dispensing apparatus to attempt to overcome these disadvantages.

SUMMARY OF THE INVENTION

In accordance with one aspect of the present invention there is provided a dispensing apparatus comprising:
 (a) a hopper dimensioned to retain a store of the particulate material, the hopper having an outlet located at its lower end;
 (b) a metering chamber connected to said outlet of the hopper, said metering chamber having curved fingers, a tumbler journalled upon said curved fingers, a flap resiliently bearing against said tumbler to maintain same journalled upon said curved fingers, said metering device also having an outlet;
 (c) said tumbler having a cylindrical body formed with two end disks, two substantially parallel longitudinal sides located between said end disks, a base located between said longitudinal sides, a longitudinal cavity defined by the said end disks, said longitudinal sides and said base, a plurality of fins radiating in substantially mutually parallel manner outwardly from each of said longitudinal sides, said fins being spaced apart such that adjacent ones of said fins inhibit passage of said particulate material therepassed, free ends of said fins being disposed to meet said flap during rotation of said tumbler;
 said tumbler being rotatable from a location whereat said longitudinal cavity is disposed toward said outlet of the hopper for filling with said particulate material and to a location whereat said longitudinal cavity is disposed toward said outlet of the metering chamber for dispensing of said particulate material.

BRIEF DESCRIPTION OF THE DRAWINGS

The present invention will now be described, by way of example, with reference to the accompanying drawings, in which:

FIG. 5 is an upper perspective view of a tumbler for use with the dispensing apparatus;

FIG. 6 is an upper perspective view of a water container for use with the dispensing apparatus;

FIG. 7 is an upper perspective view of a food container for use with the dispensing apparatus.

DESCRIPTION OF THE PREFERRED EMBODIMENT

Figure 1:
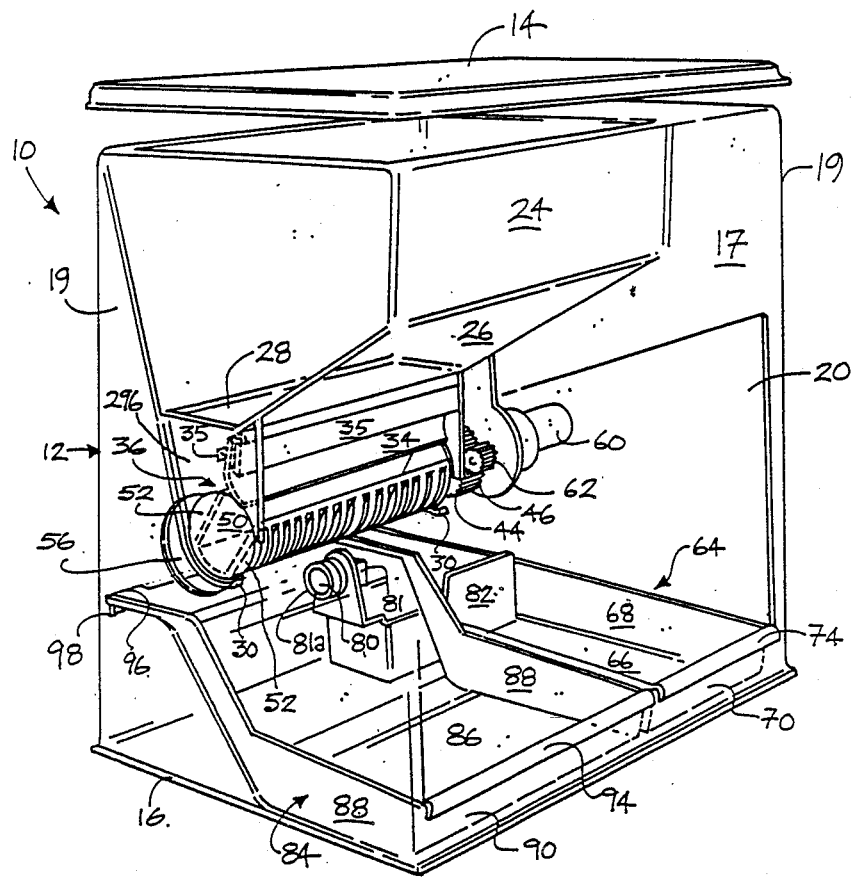
FIG. 1 is a perspective view of a dispensing apparatus in accordance with the present invention.
Figure 2:
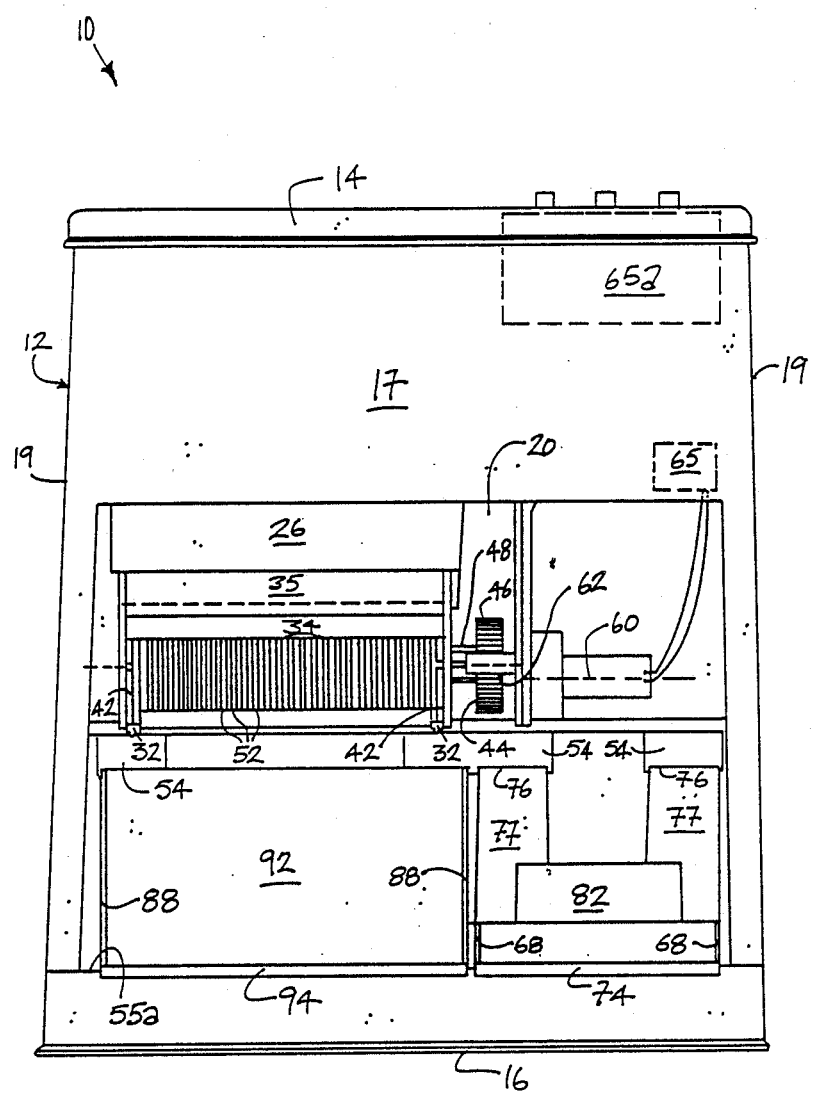
FIG. 2 is a front view of the dispensing apparatus.
Figure 3:
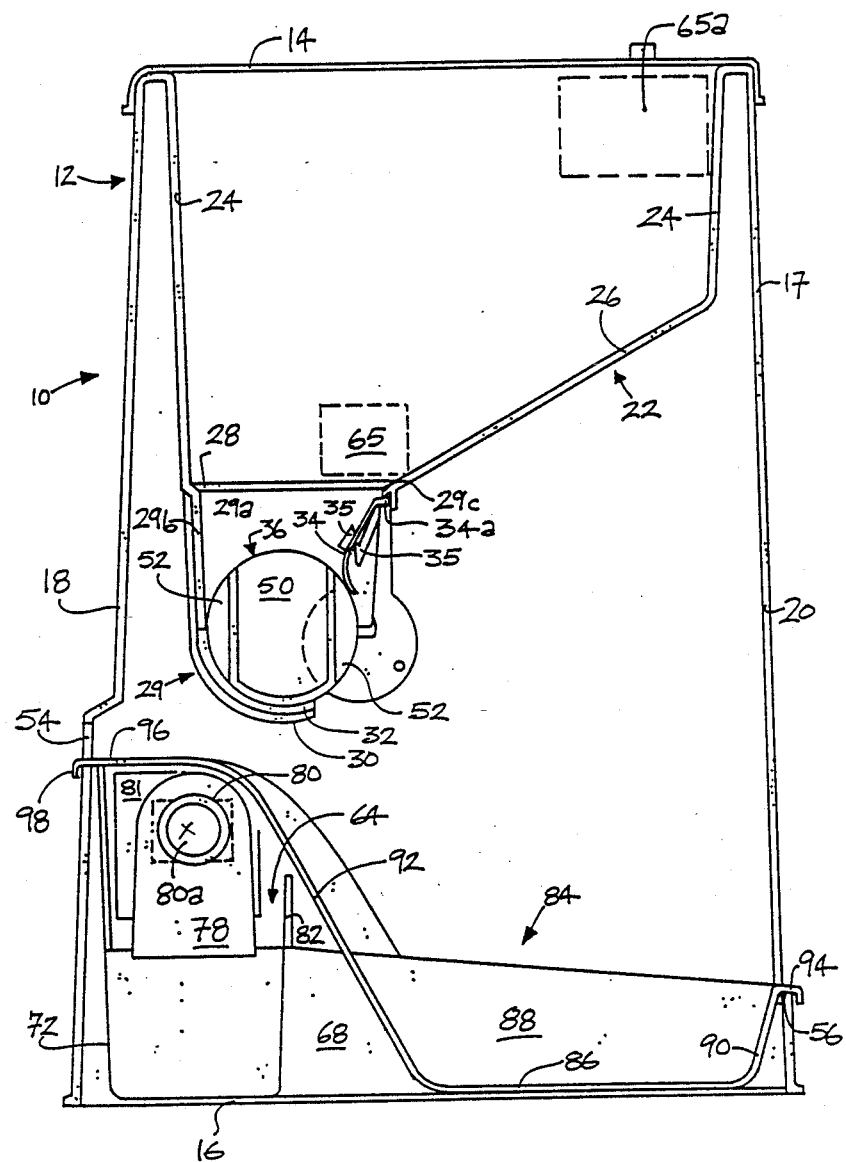
FIG. 3 is a sectional side view of the dispensing apparatus.

Shown in FIGS. 1, 2 and 3 is a dispensing apparatus 10 comprising a housing 12 having a lid 14, a base 16, a front wall 17, a rear wall 18 and side walls 19. The front wall 17 has an opening 20.

As shown in FIG. 3, the lid 14 covers a hopper 22 located inside the housing 12 and dimensioned to received a store of particulate material, such as, pelletized animal food or edible grains. The hopper 22 has sides 24 and a sloping bottom 26 leading to an outlet 28.

Figure 8:
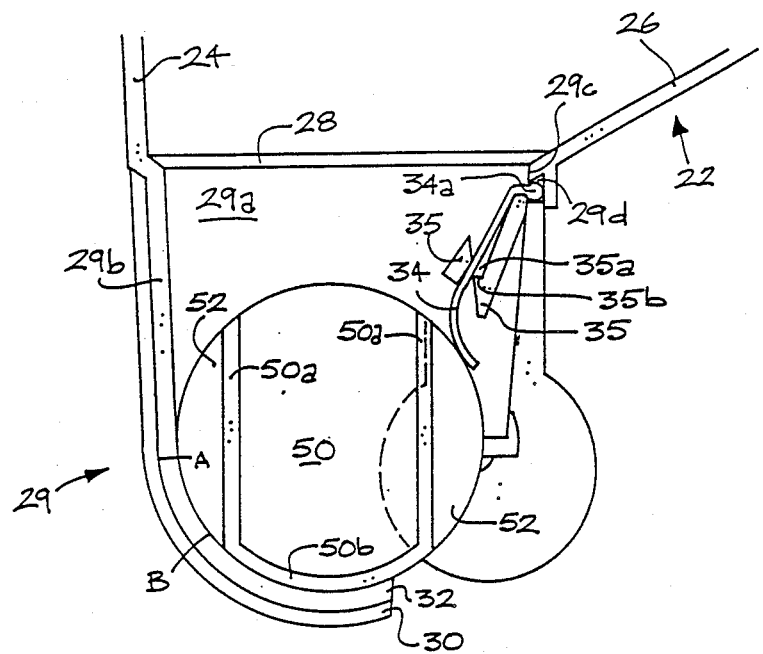
FIG. 8 is a sectional side view of a metering chamber of the dispensing apparatus.

Attached to the outlet 28 is a metering chamber 29, which may be better seen in FIG. 8 to be formed in part by two side walls 29a a back wall 29b and a front edge 29c. Depending from the back wall 29b are curved fingers 30, each having an upstanding rib 32. The metering chamber 29 is also formed in part by a flap 34 attached to the front edge 29c.

Spaced from, the front edge 29c is a retainer 35 extending between the side walls 29a. The retainer 35 comprises a slot 50 and an edge 35b directed into the slot 35a. The spacing of the front edge 29c and the retainer 35 forms a slot 29d. The flap 34 comprises an enlarged edge 34a dimensioned to be lockably received in the slot 29d and with the body of the flap 34 disposed through the slot 35 and gripped by the edge 35b.

The flap 34 resiliently bears on a tumbler 36, which constitutes a further part of the metering chamber 29 and as shown in FIG. 5, comprises a cylindrical body 38 having a disc 40 at each end thereof and each disc 40 having a peripheral circumferential groove 42. A gear wheel 44 having peripheral teeth 46 is attached to one of the discs 40 by a spindle 48 (FIG. 2).

The cylindrical body 38 has a longitudinal cavity 50 defined between the discs 40. The cavity 50 preferably has a parallel longitudinal sides 50a and a cured base 50b therebetween. As shown, the body 38 has a plurality of external fins 52 radiating from each of the sides 50a. Free ends of the fins 52 form part of the cylindrical exterior of the body 38. The fins 52 are substantially mutually parallel and spaced apart such that the particulate material does not tend to lodge between adjacent fins 52.

As shown in FIGS. 3 and 8, the tumbler 36 is journalled to the metering chamber 29 by engagement of the ribs 32, of the fingers 30, in the grooves 42. This allows the tumbler 36 to rotate about its longitudinal axis, whilst being located by the ribs 32. Further, the flaps 34 bears on the external fins 52 to maintain the tumbler 36 in rolling engagement with the fingers 30.

The metering chamber 29 also comprises an outlet 29e which extends from the back walls 29b between the fingers 30 and to the flaps 34. The back wall 29b meets the periphery of the tumbler 36 either at a line or over a portion of its circumference. In either case it is preferred that the meeting be disposed so as to allow free passage for the particulate material into and out of the cavity 50. Typically, the back wall 29b terminates at or before a location defined by the intersection of one of the longitudinal walls 50a and the base 50b when the former is disposed vertically and adjacent the flap 34. More typically, the back wall 29b terminates at or before a location defined by the intersection of the other one of the longitudinal walls 50a and the base 50b when the former is disposed vertically and remote from the flap 34. More particularly, it is preferred that the meeting occur between points designated A & B shown in FIG. 8. It is to be noted that Point B is located above the intersection of the side 50a and the base 50b of the tumbler 36. The fins 52 are provided to bear against the back wall 29b and the flap 34 to close off the meeting chamber 29 to prevent passage of particulate material out of the outlet 29e.

In this way any dust occurring with particulate material may fall between the fins 52 and through the outlet 29e without accumulating between the back wall 29b and the side 50a of the tumbler 36.

Also, the fins 52 are provided to allow for use of parallel sides 50a so that the tumbler 36 may be fabricated by a single mold process. That is, if the fins 52 were removed and the sides 50a used to form part of the cylindrical prior of the body 38, then a multiple mold process would have to be used.

Figure 4:
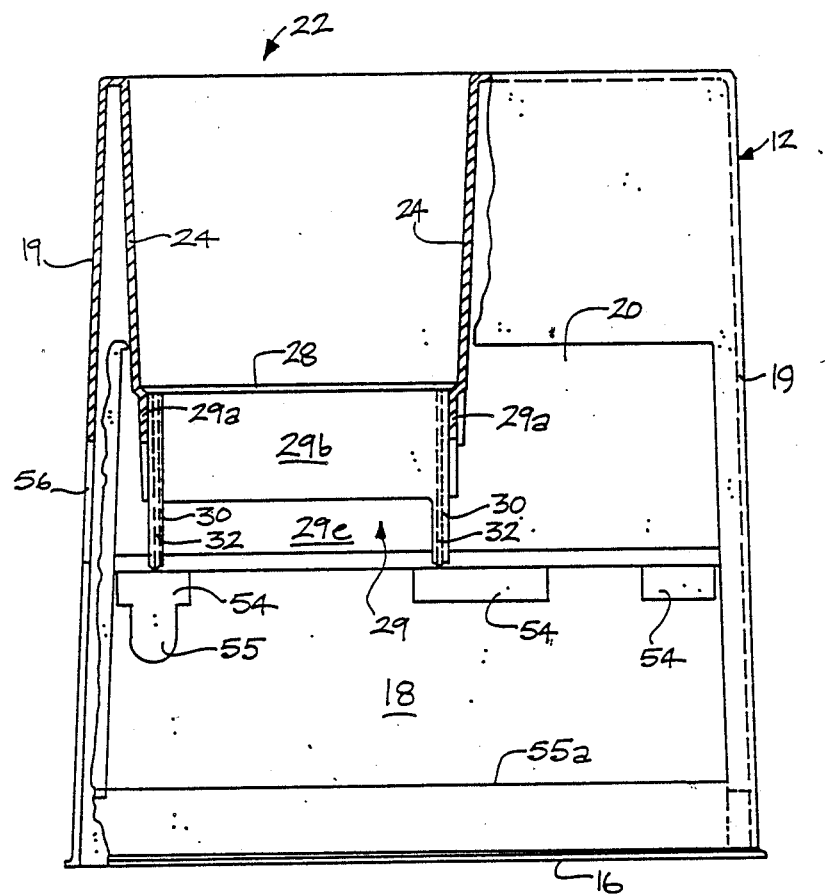
FIG. 4 is a partially cut away front view of a housing of the dispensing apparatus.

FIG. 4 shows the housing 12 which has a plurality of apertures 54, in the rear wall 18. The apertures 54 are herein referred to as left, middle and right apertures 54. The left aperture 54 has a further slot portion 55 extending from its lower edge.

Further, the opening 20 has a bottom edge 55a, adjacent the base 16.

The side wall 19, has an aperture 56 disposed to allow access to the tumbler 36, for removal and insertion thereof. The aperture 56 is typically slightly larger in diameter than the disks 40, of the tumbler 36.

In FIG. 2, the housing 12 contains a motor 60, typically of the electrical type and driven by batteries 65. The motor 60 drives a pinion gear 62 which engages the gear 44, when the tumbler 36 is supported by the fingers 30. The motor has associated control means 65a.

Typically, the control means 65a is a programmable microprocessor and memory means programmed to receive inputs from a user and to periodically activate the motor 60.

Shown in FIG. 6 is a water container 64 having a base 66, side walls 68, a front wall 70 and a rear wall 72 to define a volume. The front wall 70 has an external hooked flange 74. The rear wall 72 has an external hooked flange 76 at the ends of upright ears 77. One of the side walls 68 has an upright member 78 attached thereto having a aperture 80. A float valve mechanism 81 is attached to the member 78 to regulate the flow of water through a connection means 81a attached to the aperture 80. A baffle 82, intermediate the front and rear walls 70 and 72 is provided to protect the float valve mechanism 81 from damage by an animal or bird using the water container 64.

FIG. 7 shows a food container 84 having a base 86, side walls 88, a front wall 90 and a rear wall 92 to define a volume. The front wall 90 has an external hooked flange 94. The rear wall 92 has generally horizontal portions 96 extending from its end remote from the base 86. The horizontal portions 96 have downwardly depending flanges 98.

To assemble the dispensing apparatus 10, the tumbler 36 is first slid, gear 44 first, through the aperture 56, of the housing 12. The tumbler 36 is then slid over the ribs 32, the flap 34 thereby being resiliently deflated upwardly. The tumbler 36 continues to be slid until the gear 44 is adjacent the pinion 62, of the motor 60.

In this condition, the grooves 42, of the tumbler 36, are disposed over the ribs 32. The tumbler 36 is then displaced downwardly so that the gear 44 engages the pinion 62 and the ribs 32 engage the grooves 42. Thus, axial movement of the tumbler 36 is inhibited. Further, the flap 34 bears in the exterior of the cylindrical body 38 and thereby journals the tumbler 36 to the metering chamber 29. The water container 64 is then passed, rear wall 72 first, through the opening 20. The hooked flanges 76 are then disposed over the lower edges of the middle and right apertures 54 (shown in FIG. 3). Further, in this condition, the hooked flange 74 is disposed over the lower edge 55a, of the opening 20. Thus, the water container 64 is securely held in the housing 12. A water conduit, such as a hose, is then passed through the slot portion 55 and connected to the connection means 81a attached to the aperture 80. Water may then flow, regulated by the float mechanism 81, into the container 64.

The food container 84 is then passed, rear wall 92 first, through the opening 20, in the housing 12. The horizontal portions 96 are then displaced through the left and middle apertures 54 (shown in FIG. 4) so that the portions 96 rest on the lower edge of the apertures 54 and the flanges 98 are outside the housing 12 (see FIG. 3). In this condition, the hooked flange 94 is disposed over the lower edge 56, of the opening 20. The container 84 is thus securely held in the housing 12.

In use, particulate material, typically being food is then placed into the hopper 22 and the lid 14 disposed to cover the hopper 22. Food then falls into the metering chamber 29 under the action of gravity. The tumbler 36 is oriented with the base 50b lowermost to receive a measure of the food. The control means 65a is then programmed to give a number of rotations of the tumbler 36, considered by the user to provide sufficient food for the animal or bird, and the time at which such rotations are to occur. At the selected time, or times, the control means 65a operates the motor 60 which rotates the pinion 62. The pinion 62, which engages the gear 44, thereby rotates the tumbler 36 about its longitudinal axis, typically clockwise in FIG. 7. The flap 34 and the fins 52 prevent food from falling accidentally into the food container 84. When the tumbler 36 is rotated, the cavity 50 rotates to face into the food container 84, and the food in the cavity 50 falls into the container 84. The control means 65a continues to operate the motor 60 until the tumbler 36 has been rotated the preset number of times. Thus, a controlled amount of food may be dispensed at selected times.

An animal may then pass its head through the opening 20 to eat food from the container 84 or drink water from the container 64.

As water is consumed from, the container 64 the float valve mechanism 81 lowers to allow more water from the water supply to flow into and refill the container 64. In this way the water level is maintained.

For the purposes of cleaning, the containers 64 and 84 are easily removable yet securely held from inadvertent movement. Further, the tumbler 36 may be easily extracted from the fingers 30 by reversing the steps for installation. Similarly, the flap 34 may be removed and cleaned.

The present invention provides a dispensing apparatus which allows controlled and regulated feeding of animals without human supervision. The present invention may also be easily dismantled for cleaning.

By the nature of the tumbler 36, the flaps 34, the fins 52 and the back wall 29b, relatively large particulate material may be dispensed without jamming against the flap 34 and dust inherent with the particulate material does not tend to collect in and foul the metering chamber 29. Also, by use of the flap 34 particulate material which may be located part way in the cavity 50 and part way out of the cavity 50 results in resilient deformation of a part of the flap 34 but also avoids leakage of other particulate material passed the flap 34 whilst the tumbler 36 is rotated to dispense a measure of the particulate material. Modifications and variations such as would be apparent to a skilled addressee are deemed within the scope of the present invention.

I claim:

1. A dispensing apparatus for dispensing particulate material, the dispensing apparatus comprising:
   (a) a hopper dimensioned to retain a store of the particulate material, the hopper having an outlet located at its lower end;
   (b) a metering chamber connected to said outlet of the hopper, said metering chamber having curved fingers, a tumbler journalled upon said curved fingers, a flap resiliently bearing against said tumbler to maintain same journalled upon said curved fingers, said metering chamber also having an outlet;
   (c) said tumbler having a cylindrical body formed with two end disks, two substantially parallel longitudinal sides located between said end disks, a base located between said longitudinal sides, a longitudinal cavity defined by said end disks, said longitudinal sides, and said base; a plurality of fins radiating in substantially mutually parallel manner outwardly from each of said longitudinal sides, said fins being spaced apart such that adjacent ones of said fins inhibit passage of said particulate material therepassed, free ends of said fins being disposed to meet said flap during rotation of said tumbler;
   said tumbler being rotatable from a location whereat said longitudinal cavity of said tumbler is disposed toward said outlet of the hopper for filling with said particulate material and to a location whereat said longitudinal cavity of said tumbler is disposed toward said outlet of the metering chamber for dispensing of said particulate material.

2. A dispensing apparatus according to claim 1, further comprising a motor arranged to rotate said tumbler, a control means to control operation of said motor to rotate said tumbler a predetermined number of revolutions at a predetermined time.

3. A dispensing apparatus according to claim 1 further comprising a housing dimensioned to contain said hopper and said metering chamber, said housing having a front wall and a rear wall, an opening in said front wall through which an animal may pass its head, said opening having a bottom edge, a plurality of apertures in said rear wall, said apertures each having a lower edge, said dispensing apparatus also comprising a water container having external hooked flanges at front and rear walls thereof, a food container having external hooked flanges at front and rear walls thereof, means for supplying water to said water container, a float valve mechanism attached to said water container to maintain the level of water in said water container, said food container and said water container being disposed within said housing such that said external hooked flanges are disposed over said bottom edge of the opening and over said lower edge of the plurality of apertures so that said water container and said food container are securely held in said housing.

4. A dispensing apparatus according to claim 3 in which said housing comprises a side wall having an aperture, said aperture being disposed to allow access to said tumbler for removal and insertion thereof, said aperture being slightly larger in diameter than said end disks.

5. A dispensing apparatus according to claim 3, in which said water container comprises a baffle, said baffle being located intermediate said front and rear walls of the water container to protect said float valve mechanism from damage by an animal using said water container.

6. A dispensing apparatus according to claim 1 in which said metering chamber also comprises two side walls between which said flap extends and a back wall extending between said side walls opposite said tumbler from said flap, said curved fingers depending from said back wall and disposed toward said flap, said curved fingers each comprising an upstanding rib, a circumferential groove provided around the periphery of each of said end discs of the tumbler, said upstanding ribs engaging with said circumferential grooves to journal said tumbler to said curved fingers.

7. A dispensing apparatus according to claim 6, in which said outlet of the metering chamber extends from said back wall of the metering chamber to said flap, said back wall meeting said tumbler over a part of its periphery, said meeting terminating before a location defined by an intersection of said base with one of said longitudinal sides when disposed vertically and adjacent said flap.

8. A dispensing apparatus according to claim 6, in which said outlet of the metering chamber extends from said back wall of the metering chamber to said flap, said back wall meeting said tumbler over a part of its periphery, said meeting terminating before a location defined by an intersection of said base with one of said longitudinal sides when disposed vertically and remote from said flap.

9. A dispensing apparatus according to claim 6, in which said flap comprises an enlarged edge, a slot is provided in a front edge of said metering chamber, said enlarged edge being dimensioned to be lockably received in said slot.

10. A dispensing apparatus according to claim 6, in which said flap comprises an enlarged edge, a slot is provided in a front edge of said metering chamber, said enlarged edge being dimensioned to be lockable received in said slot and said metering chamber also comprising a retainer having a slot dimensioned to receive said flap and grip same.

* * * * *